United States Patent [19]
Breeden

[11] 3,758,235
[45] Sept. 11, 1973

[54] POWER TRANSMISSION
[75] Inventor: Robert H. Breeden, Metamora, Mich.
[73] Assignee: Sperry Rand Corporation, Troy, Mich.
[22] Filed: Sept. 22, 1971
[21] Appl. No.: 182,677

[52] U.S. Cl. .............................................. 417/222
[51] Int. Cl. ............................................. F04b 1/26
[58] Field of Search................... 417/212, 213, 218, 417/221, 222; 91/388; 60/52 VS; 73/211

[56] References Cited
UNITED STATES PATENTS
| | | | |
|---|---|---|---|
| 3,165,068 | 1/1965 | Burnham et al. | 91/492 |
| 3,296,797 | 1/1967 | Tlusty | 60/52 VS |
| 3,067,693 | 12/1962 | Lambeck | 417/219 |

Primary Examiner—William L. Freeh
Assistant Examiner—Gregory LaPointe
Attorney—Theodore Van Meter

[57] ABSTRACT

A displacement adjusting system for a variable displacement pump utilizes a pair of bleed circuits connected as a hydraulic bridge to control the servomotor of the pump so as to maintain a balance between the pressure levels generated in the command bleed circuit and in the feedback bleed circuit. The adjustable restriction in the feedback circuit is of the laminar flow type, its length being adjusted with changes in pump displacement. Input torque is limited by a relief valve acting on the control pressure in the command circuit. Pump outlet pressure is limited by a valve which disables the bleed circuits. The system is applicable to both one-way and reversible displacement pumps.

10 Claims, 2 Drawing Figures

POWER TRANSMISSION

In hydraulic power transmission systems utilizing a variable displacement pump with a hydraulic servomotor for operating the displacement varying member of the pump, it has been proposed frequently to utilize a hydraulic bridge circuit for controlling the servomotor. Such a circuit by its analogy to the electrical Wheatstone bridge, utilizes a pair of bleed circuits generating intermediate pressures, one of which may be adjusted by command and the other which is adjusted by the servomotor response. Examples of such controls appear in the U.S. Pat. to Doe, No. 2,177,098, Oct. 24, 1939, and U.S. Pat. to Tweedale, No. 2,253,663, Aug. 26, 1941. The former uses adjustable spring loaded relief valves in the respective bleed circuits for setting the intermediate pressure levels and the latter utilizes compensated flow control valves for the same purpose. In each case, the appropriate pressure drops in the bleed circuits are established by orifices in which turbulent flow takes place. Pressure dropping restrictions of the laminar flow type have been proposed for controlling variable displacement pumps as in the U.S. Pat. to Waldie, No. 2,418,532, Apr. 8, 1947 (FIG. 5) and U.S. Pat. to Lonnemo, No. 3,554,093, Jan. 12, 1971. In Waldie the pump is regulated to maintain a substantially constant, but adjustable outlet pressure. The laminar flow restriction is merely ancillary to this function in that it provides a means for adjusting the outlet pressure. In Lonnemo the laminar flow restriction is one of three influences upon the displacement adjusting member, the other two being the pump outlet pressure and a spring. These influences result in maintaining the pump at full displacement except when the load requires more than a predetermined input torque at the pump shaft. The control then maintains the displacement at the highest level that will require this maximum input torque.

The present invention is based upon the discovery that a single laminar flow restriction may be so constructed and connected that it will generate the feedback control pressure in a hydraulic bridge circuit as a substitute for the usual fixed and variable turbulent flow orifices to produce the same local or remote control capabilities. The use of the laminar flow restriction in addition, however, provides the capability for monitoring the input torque of the pump to maintain it at or below a selected torque level, or as is frequently referred to with constant speed pumps to maintain a limit on the horsepower required to drive the pump. Such a control system will function, moreover, at any desired torque level merely by a simple spring adjustment without requiring change or substitution of any of the mechanical parts such as cams, springs, or the like. It is frequently desirable to provide for both manual and automatic adjustment of pump or motor displacement with remote control capability. Other common requirements include automatic pressure limits, automatic displacement limits and coordinated pump and motor controls for vehicle propulsion drive.

It is an object of the present invention, therefore, to provide an improved displacement adjusting system for a variable displacement pump to take advantage of the unique characteristics of laminar flow restrictions to improve the performance capabilities of such systems, and to do so with simple, reliable, low-cost components. This the present invention achieves through providing a displacement adjusting system for a variable displacement pump which comprises a member shiftable to change the pump displacement, hydraulic servomotor means to shift the member, a source of control pressure fluid, oppositely acting means for controlling the servomotor including a pair of bleed circuits extending from the fluid pressure source, one bleed circuit constituting the command circuit and having restricting means for generating a controlling pressure at any commanded level, the other bleed circuit constituting a feedback circuit and having laminar-flow restrictions of variable length connected to the shiftable member for generating an opposing controlling pressure at a level responsive to the position of the shiftable member whereby the pump displacement may be adjusted by changing the degree of restriction in the command circuit.

IN THE DRAWINGS

Figure 1:
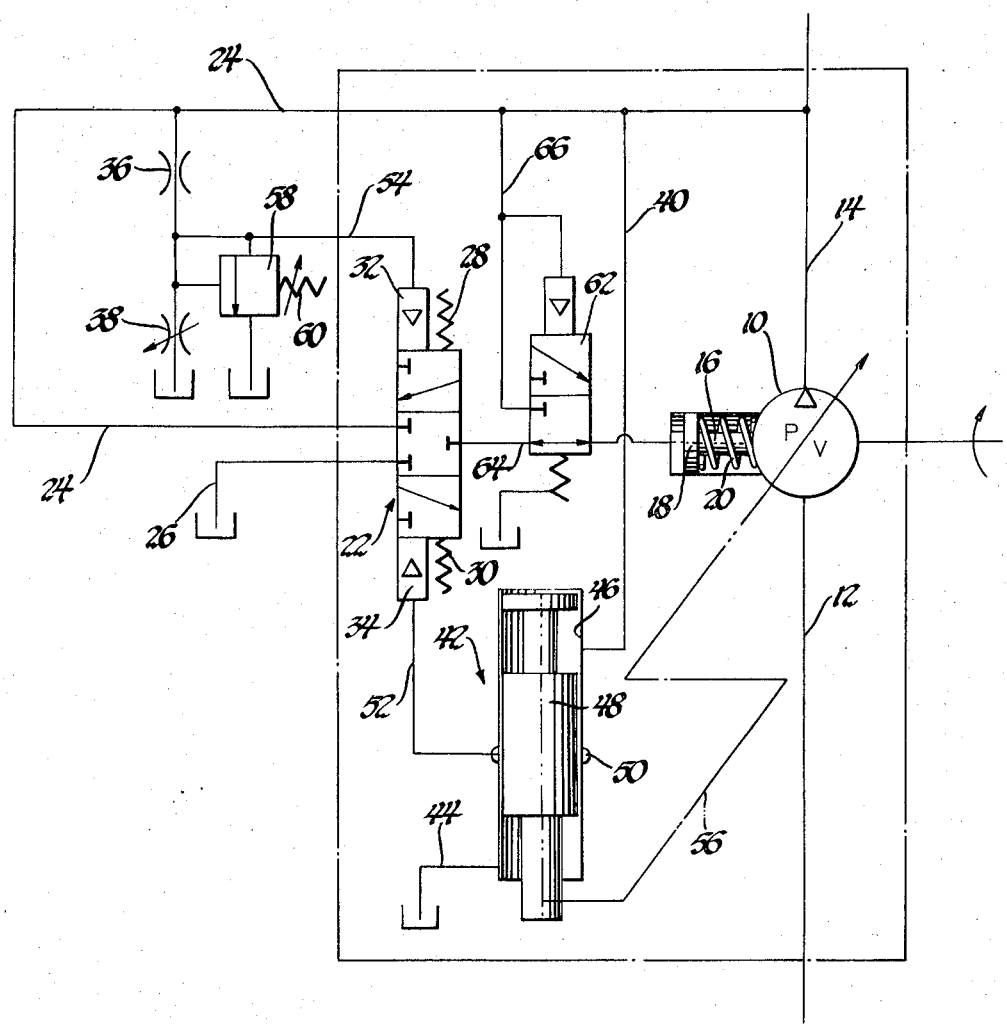
FIG. 1 is a circuit diagram of a first form of the present invention.

Referring now to FIG. 1, a one-way variable displacement pump 10 has an inlet 12 and an outlet 14. A member 16 for adjusting the pump displacement is under the control of a servomotor indicated by the piston 18. A spring, or other biasing means 20, urges the member 16 into full displacement position. A three-way pilot valve 22 controls the servomotor 18 by either admitting fluid from the delivery line 14 through the branch 24 or exhausting it to reservoir through the line 26 and, in the neutral position illustrated, blocks both such flows. Pilot valve 22 is spring biased to center position by springs 28 and 30 and may be shifted to either side of center by pilot servomotor 32 and 34. These pilot servomotors are connected to respond to the intermediate control pressures generated in the bleed circuits of the hydraulic bridge control.

The command bleed circuit consists of the fixed restrictor 36 and the variable restrictor 38, connected in series between a source of pressure fluid, represented by the branch line 24, and the reservoir. The feedback bleed circuit comprises the branch 40, leading from the same pressure fluid source 24, to a variable restrictor of the laminar flow type indicated generally at 42 and after passing through this restrictor, extends by the line 44 to the reservoir. The laminar flow restrictor 42 comprises a cylinder 46 within which is a freely slidable, somewhat loose fitting plunger 48. A groove 50 in the cylinder wall provides a tap-off point at which control pressures are generated and which is connected by a line 52 to the pilot servomotor 34. Similarly, a line 54 connects the pilot servomotor 32 to a point intermediate the restrictors 36 and 38. The plunger 48 is mechanically connected, as indicated by the dash and double dot line 56, with the displacement varying member 16 of the pump 10. This connection may take any of the many known forms. For example, in U.S. Pat. to Lonnemo, No. 3,554,093, above mentioned, the coaxial relationship between plunger 27 or 27a and the servo piston 34 or 34a can be used to connect applicant's plunger 48 and servomotor piston 18. Other suitable feedback connections between a pump stroking member and a feedback valve control are illustrated in U.S. Pat. to Doe No. 2,177,098 at 42, 56, 54 of FIG. 1 and in U.S. Pat. to Keel No. 2,870,746, FIGS. 3 and 4 at 118, 112, 114, and 110. It will be understood that the connection should be such that as the servomotor 18 moves to decrease the pump displacement, the plunger 48 will be moved to decrease the resistance between lines 40 and 52 and simultaneously increase that between lines 52 and 44.

In order to take advantage of the capabilities of the laminar flow feedback circuit for the purpose of adjustably limiting the input torque required at the pump 10, the simple pressure responsive relief valve 58 is connected to the branch line 54 so as to limit the maximum pressure which can be generated for command purposes and applied to the servomotor 32. This pressure may be adjusted by adjusting the spring 60. For prime movers which maintain substantially constant speed over a wide torque range, such a control will maintain a constant horsepower limit, maintaining a substantially hyperbolic relationship between pump output flow and output pressure. Similarly, in order to provide a maximum limit to the pressure in the pump outlet line 14, a pressure responsive two-way valve 62 may be connected into the line 64 between pilot valve 22 and servomotor 18. The pressure limiting valve 62 is connected by line 66 and line 24 to the pump outlet line 14, and when pressure therein reaches a predetermined high value, valve 62 shifts, cutting off servomotor 18 from pilot valve 22 and connecting it directly to branch 66. This forces the pump to a new displacement position sufficiently small to avoid further pressure build-up in the outlet line 14.

In the operation of the embodiment illustrated in FIG. 1, normally the pump displacement is regulated by action of the pilot valve 22 upon the servomotor 18. Pilot valve 22 achieves a center position only when the pressures in servomotors 32 and 34 are balanced. Under such conditions, in the command circuit, a continuous bleed takes place from line 24 through restrictors 36 and 38 and the intermediate pressure is directed for control purposes through line 54 to servomotor 32. Likewise, in the feedback bleed circuit, flow occurs through line 40 to the laminar flow restrictor 42 and through it and line 44 to the reservoir. The intermediate pressure measured at the groove 50 is directed through line 52 to servomotor 34. Any change required or desired in the pump displacement setting is produced by changing the degree of restriction at command restrictor 38, thus causing a new control pressure, either higher or lower than before, to exist in line 54 and servomotor 32. This will cause pilot valve 22 to shift, actuating the servomotor 18 in the appropriate direction and carrying with it the plunger 48 of the laminar flow restrictor to produce a new control pressure at groove 50 and line 52 which will again balance servomotor 34 against servomotor 32, restoring pilot valve 22 to neutral.

Since in a laminar flow restriction such as 42, the pressure drop from inlet to the control groove 50 is a substantially linear function of the distance through which fluid has to flow in the clearance space, and since any movement of the plunger 48 produces opposite changes in the length of the flow paths (a) from the inlet to the groove 50 and (b) from the groove 50 to the outlet, and since the inlet pressure corresponds to the pressure in the pump outlet line, it follows that the control pressure at groove 50 is a function of the product of pump outlet pressure and pump displacement setting. This product is, in turn, a measure of the input torque requirements of the pump under these conditions, and it is this pressure which must be balanced by the pressure in line 54 in order for any setting of the servomotor 18 to be maintained fixed.

If the adjustable command restrictor 38 is so operated as to require a displacement setting which at the particular outlet pressure level being then experienced would exceed the allowable input torque of the pump, then the torque limiting relief valve 58 will open, thus permitting pilot valve 22 to shift upwardly in FIG. 1 and direct pump outlet pressure to the servomotor 18 and reduce the pump displacement, until the desired input torque is not exceeded. The control, furthermore, permits maximum input torque regulation at any desired level without changing parts. Merely by adjusting the spring 60 of the relief valve 58 any maximum torque level may be chosen, since the pressure in groove 50 and line 52 is always a measure of the product of pump outlet pressure and pump displacement.

For limitation of the maximum operating pressure in outlet line 14, valves 62, which normally maintains communication between pilot valve 22 and servomotor 18 will, on a predetermined pressure rise in line 14, disconnect the pilot valve 22 and connect servomotor 18 directly to the pump outlet line 14. The fluid delivered by the pump is thus caused to reduce the pump displacement until a satisfactory pressure level is achieved.

Figure 2:
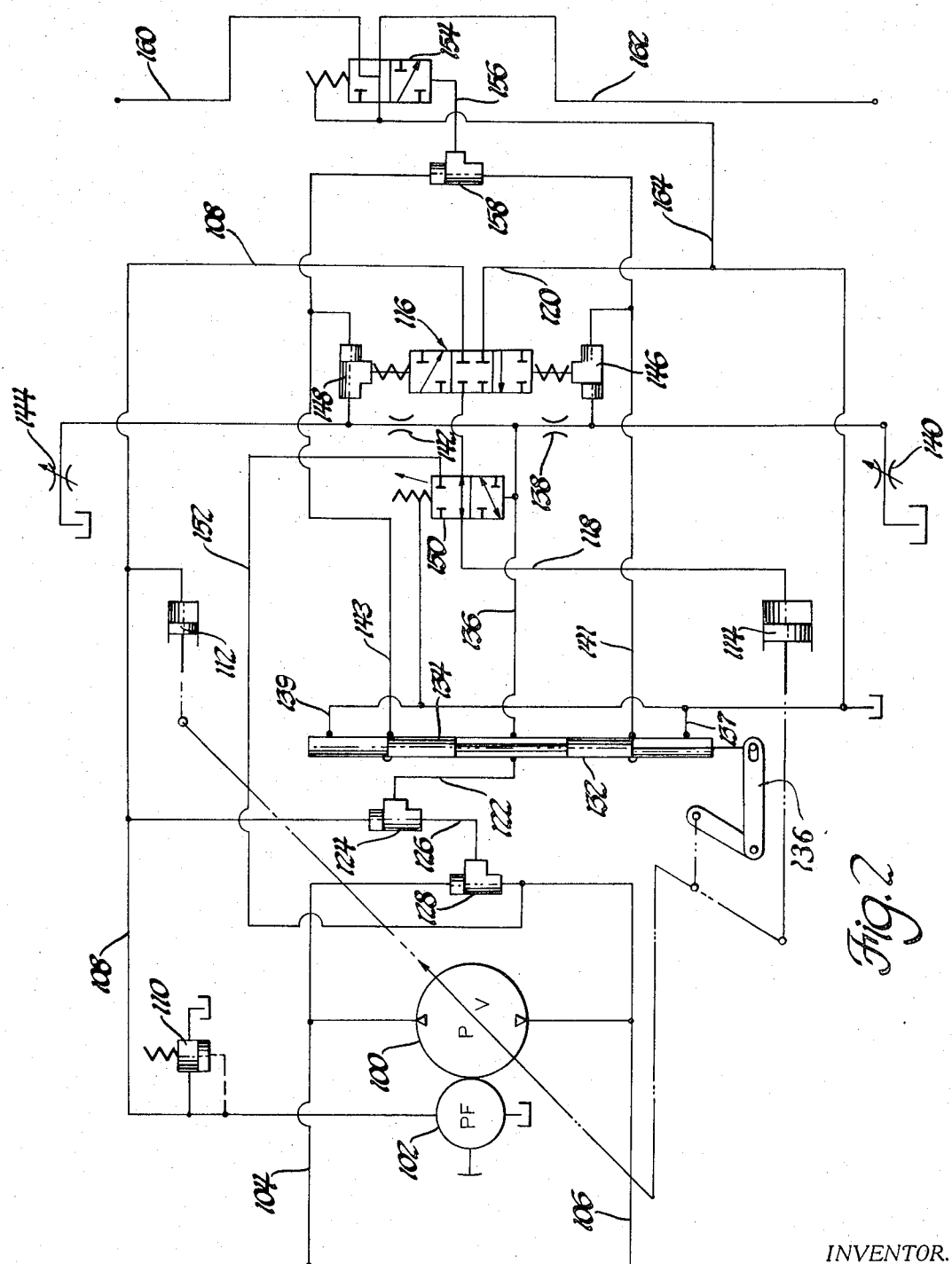
FIG. 2 is a circuit diagram of a second form of the present invention.

Referring now to FIG. 2, a similar system is there illustrated as applied to a reversible variable displacement pump 100 having an associated constant displacement control pressure pump 102 attached to it. The pump 100 delivers either into the line 104 or the line 106 and withdraws fluid from the other, depending upon its displacement setting. Pump 102 delivers into a control pressure supply line 108, the pressure in which is governed by a relief valve 110. The displacement of the pump 100 is shiftable between maximums on either side of center through a differential area servomotor indicated by the pistons 112 and 114 of small and large areas respectively. Piston 112 is permanently connected to the control pressure line 108 which also supplies control pressure to the three-way pilot valve 116. The latter controls the large area servomotor 114 through a line 118 and has a reservoir return line 120.

The pilot valve 116 is similar to the pilot valve 22 of FIG. 1. However, duplicate hydraulic bridge circuits are provided for controlling pilot valve 116, each circuit being effective only on one side of the zero displacement position of the pump 100. A pressure fluid supply source to the bleed circuits is provided by means of line 122. A shuttle valve 124 in the position illustrated, supplies fluid through line 126 from another shuttle valve 128 which, in the position illustrated, supplies fluid from the main pump line 106 and in the opposite position, supplies fluid from the other main line 104. Likewise, shuttle valve 124 supplies fluid from the control pump 102 through line 108 whenever that pressure is higher than the pressure in either of the pump main lines 104 and 106. A bel-crank 130 transmits motion from the displacement varying mechanism of pump 100 to a dual laminar flow restrictor device 132-134.

The two command bleed circuits are supplied from the fluid pressure source by line 136, the lower bleed circuit being constituted by fixed restrictor 138 and variable restrictor 140 and the upper bleed circuit being constituted by the fixed restrictor 142 and the variable restrictor 144. The intermediate control pressures which are generated in these command bleed circuits are fed to shuttle valves 146 and 148 connected to the pilot servomotors of valve 116.

The feedback bleed circuits pass from the fluid pressure source 122 through the laminar flow restrictors 132 and 134 to the outlet lines 137 and 139. Intermediate control pressure is tapped off and fed through lines 141 and 143 to the opposite sides of the shuttle valves 146 and 148, the arrangement being such that when, as illustrated command restrictor 144 is in control, restrictor 132 provides the feedback and when command restrictor 140 is in control, restrictor 134 provides the feedback and shuttle valves 146 and 148 occupy positions opposite to the positions illustrated. Alternatively, the command restrictors 140 and 144 may be located at 137 and 139 and shuttle valves 146 and 148 eliminated.

Limitation of delivery pressure is provided by the pressure responsive valve 150 connected to respond to the pressure in line 136. Similarly to valve 62, this valve disconnects the pilot valve 116 from the servomotor 114 and instead connects it to a line 152 leading to the main pump line 106. If this line happens to be under pressure, that pressure will be supplied to the servomotor 114, reducing the pump displacement delivered into line 106. If that line, however, is not under pressure, valve 150 will exhaust servomotor 114, thus reducing the pump displacement into line 104.

If limitation of input toruqe is desired, valves similar to valve 58 of FIG. 1 may be connected to dump at a predetermined pressure in the line ahead of restrictors 140 and 144.

In those applications where it is desirable to simultaneously control brakes, clutches and the like, a valve 154 may be connected through a line 156 and shuttle valve 158 to receive pressure fluid from either of the lines 141 or 143. When the pressure in both these lines is zero, as happens in the zero displacement position of pump 100 and of laminar restrictors 132 and 134, then the spring bias of valve 154 holds it in the position shown in FIG. 2 to exhaust the brake and clutch lines 160 and 162 back to reservoir through line 164. Thus, a brake which is spring applied and hydraulically released and a clutch which is spring released and hydraulically applied, may be controlled by valve 154 either directly or through a hydraulic relay. As soon as pressure builds up in either line 141 or 143, valve 154 will deliver it to lines 160 and 162, thus releasing the brake and applying the clutch.

The control of the displacement of a hydraulic motor may be accomplished similarly to the manner above described, as for example by using a circuit similar to FIG. 1, although without necessity for providing the pressure limiting valve 62. In this case, however, the connection between the variable laminar flow restrictor plunger 48 and the displacement controller of the motor will be reversed.

I claim:
1. A displacement adjusting system for a variable displacement pump or motor unit comprising a member shiftable to change the unit displacement, hydraulic servomotor means to shift the member, a source of control pressure fluid, oppositely acting means for controlling the servomotor including a pair of bleed circuits extending from the fluid pressure source, one bleed circuit constituting the command circuit and having restricting means for generating a controlling pressure at any commanded level, the other bleed circuit constituting the feedback circuit and having laminar flow restrictions of variable length connected to the shiftable member for generating an opposing controlling pressure at a level responsive to the position of the shiftable member, whereby the unit displacement may be adjusted by changing the degree of restriction in the command circuit.

2. A system as defined in claim 1 wherein the means for controlling the servomotor includes a pilot valve responsive to the opposing pressures generated in the bleed circuits.

3. A system as defined in claim 1 wherein the bleed circuits are supplied from the high pressure side of the unit.

4. A system as defined in claim 3 wherein a pressure responsive valve is connected to limit the pressure level in the command circuit whereby the maximum torque input to the pump may be limited by the combined variations in pump outlet pressure and pump displacement as reflected in the pressure level in the feedback circuit.

5. A system as defined in claim 4 including means for adjusting the action of the pressure responsive valve whereby to change the input torque level to which the pump is limited.

6. A system as defined in claim 1 having means responsive to the achieving of a selected maximum pressure at the pump outlet for delivering fluid from the pump outlet to the servomotor directly and independently of the control pressure levels in the bleed circuit.

7. A system as defined in claim 3 having means responsive to the achieving of a selected maximum pressure at the pump outlet for delivering fluid from the pump outlet to the servomotor directly and independently of the control pressure levels in the bleed circuits.

8. A system as defined in claim 1 wherein the pump displacement is both variable and reversible across a neutral setting and a second pair of similar bleed circuits are provided to control the servomotor on the opposite side of neutral.

9. A system as defined in claim 8 including a pair of shuttle valves for controlling the action of the respective bleed circuits upon the servomotor.

10. A system as defined in claim 1 wherein the laminar flow restrictions are mutually variable, an increase in one resulting in a corresponding decrease in the other.

* * * * *